Jan. 23, 1973 J. BARON 3,712,960

AUTOMATIC PEPERTORY TELEPHONE DIALER UTILIZING MAGNETIC MEMORY STORAGE

Filed June 2, 1969

3 Sheets-Sheet 1

Jan. 23, 1973 J. BARON 3,712,960

AUTOMATIC PEPERTORY TELEPHONE DIALER UTILIZING MAGNETIC MEMORY STORAGE

Filed June 2, 1969 3 Sheets-Sheet 2

Inventor
JEAN BARON
By Holcombe, Wetherill + Brisebois
Attorneys

United States Patent Office 3,712,960

Patented Jan. 23, 1973

3,712,960

AUTOMATIC REPERTORY TELEPHONE DIALER UTILIZING MAGNETIC MEMORY STORAGE

Jean Baron, 25 Rue du Fer a Cheval, Saint-Germain-en-Laye, France

Filed June 2, 1969, Ser. No. 829,447
Claims priority, application France, Nov. 5, 1968, 172,627
Int. Cl. H04m *1/46*
U.S. Cl. 179—90 BB 13 Claims

ABSTRACT OF THE DISCLOSURE

A magnetic memory for storing numbers or information, which may be in coded form. This memory is in the form of juxtaposed magnetic tracks on a magnetic drum, preferably having a small diameter and adapted to cooperate with at least one magnetic head in order to record said numbers or information in said memory, and a pulse-controlled step-by-step motor for driving said drum which turns through a predetermined angle in response to each pulse. The device may comprise means for deriving from said memory signals which will cause the transmission of a telephone number over a telephone line.

This invention relates to a magnetic memory for storing numbers or information, which may be in coded form. This memory is in the form of juxtaposed magnetic tracks, each of which, after recording, comprises consecutive portions which are totally magnetized in one direction or the other, and is characterized by the combination of a magnetic drum, preferably having a small diameter and carrying several magnetic tracks adapted to cooperate with at least one magnetic head in order to record all said numbers or information in said memory, and a pulse-controlled step-by-step motor, and turning through a predetermined angle in response to each pulse.

Each step taken by the motor is normally spaced from the others by a fixed interval, so long as the frequency of the control pulses does not exceed a predetermined frequency.

Up to this maximum frequency, the time required to accelerate, the time of maximum speed, and the slowing-down time preceding each step are substantially constant from one step to the next.

It should be noted that conventional magnetic drums are of large diameter and are continuously driven by high speed motors.

The combination of such drums with their control motor does not permit step-by-step recording or reproduction, and such recording and reproduction requires the provision of a special track to synchronize the elementary signals corresponding to said numbers and information.

It is a very complex matter to provide such a special track and a phase difference often develops between the synchronization at the time of recording and that which results in practice during reproduction.

In the case of the combination according to the invention, the problem of synchronization no longer exists so long as only a single quantum of information, known as a "bit" is recorded at each step on each track. The magnetic drum must, however, be equipped with a special magnetic head adapted to be controlled by a single indicium on a track carried at one end of the drum and used solely for indexing purposes.

This drum may advantageously be cylindrical in shape and may be made of a metal covered with a magnetic layer close to or in contact with which the magnetic recording and reproducing heads are mounted. Alternatively there may be a single magnetic head which can be moved over several contiguous tracks exhibiting changes in their magnetic states, at least one part of which track may be adapted to subsequently produce pulses in the same head during reproduction.

Each group of bits representing a number, an alphanumerical character, or other information, hereinafter referred to as a "word," may be recorded or "read" successively or simultaneously, depending on whether it has been recorded in series on a single magnetic track which cooperates with a magnetic head associated with that track or in parallel, for example by means of a variable number of magnetic heads which cooperate respectively with contiguous magnetic tracks.

When the recording may be carried out in series, as in the case of a binary code, in order to reduce the total number of pulses to be recorded on a single track (which represents only a particular method of using the device according to the invention) there is associated therewith a logic circuit comprising two bistable registers, one of which may consist, for example, of two bistable elements, hereinafter referred to as "bistables" which cause the aforesaid advance of the motor in four successive steps, while the other consists of a number of bistables equal to the number of bits required for the binary coding of each so-called "word" to be recorded. First, when recording, this latter register introduces into its different bistable elements the various bits which are to be recorded. Then, during the four successive conditions of the former (two-bistable) said register, the latter register transmits the various bits to be recorded to a recording bistable element. When reading out recorded data, before starting the reading, the latter register starts an astable multivibrator which produces telephone pulses. The telephone pulses are added as binary bits to the binary coded number already stored in the latter register, until eventually, after a sufficient number of pulses have been added in, the binary coded number in the latter register steps to zero, a condition in which all of the bistable elements are in their zero positions.

Moreover, a control key is provided which terminates the recording, thus automatically resetting the bistables to zero and thereby causing the step-by-step motor to advance semi-continuously until the magnetic drum associated with that motor has made a complete revolution. This semi-continuous advance is also automatically produced during reproduction in any zone in which the corresponding magnetic track contains no magnetic changes which may be stored by one of the bistables of the second register.

The motor is stopped, as explained above, by an indexing signal transmitted by the reproducing head which cooperates with the above indexing track.

It has been seen that, when only numbers between 1 and 10 inclusive are to be recorded, the use of a binary code makes it possible to reduce to 4 the number of bits required to represent each number.

For certain other applications, it may be more advantageous to record the signals in parallel, for example, on 5 or 6 contiguous tracks, which permit the binary coding of various alphanumerical characters and conventional punctuation signs, with a motor which makes only a limited number of steps per revolution.

The device for selecting the magnetic tracks, and even the indexing track and indexing head, may be eliminated by replacing the drum covered by a magnetic coating with a plain drum provided with a support for removable magnetic tracks adhesively secured to cardboard, for example. These may carry recorded information and may be "read" step by step while travelling tangentially between the plain drum and magnetic head.

A simple electric contact, held open by the aforesaid strips of cardboard when in position for recording or reproduction, may, by closing after automatic ejection or manual retraction of the cardboard strips, stop the motor and reset the logic circuit associated therewith to zero.

The invention also comprises a specialized device for storing in the binary code telephone numbers which comprise at most ten digits and may be introduced at any speed, and for subsequently retransmitting said numbers in the form of a series of pulses corresponding to the various successive digits of these telephone numbers, which are emitted at a speed and spacing corresponding to telephone system standards. This device comprises in combination: a magnetic memory of the aforesaid type equipped with a motor taking at least four separate steps per revolution; a keyboard controlling a suitable logic circuit, which controls the operation of a step-by-step motor in groups of four steps, to store in a register having four bistables, for the duration of these four steps, either the coded signals to be recorded, or signals derived from the "reading" of a record-carrying magnetic track on the drum of the said magnetic memory, and eventually cause said step-by-step motor to turn semi-continuously until the drum driven by this motor has turned through one complete revolution, which semi-continuous motion may be initiated after the end of a recording by touching a button provided especially for this purpose, and which resets the four aforesaid bistables to zero at the end of the reproduction of a recording after shutting off a pulse generator which conforms to telephone system standards, and is connected in series with the dial of a telephone, said generator being automatically started at the end of each group of four successive steps and cut out whenever during any one of these groups all four bistables come into their zero positions; a device for selecting among the various magnetic tracks on said drum, or adapted to cooperate therewith; and a recording and reproducing switch controlled by a bistable and relay, which device may also comprise a switch for producing a pulse normally obtained by pressing a button which starts the reproduction and transmission of the recorded signals over the telephone line, immediately after the end of a complete revolution of the drum during which a call number has been recorded, so as to automatically start the reproduction and transmission.

Such devices for storing telephone numbers have been known for many years, but they have not been based on a magnetic memory capable of storing the numbers temporarily. They have instead employed a memory in the form of notched disk specially formed for each telephone number, which may thereafter be selected at will. These disks turn through a complete revolution at the time selected and at a speed dependent on their diameter and the dimensions of their notches, and transmit over a telephone line a series of impulses conforming to the norms of the system. Such disks, made once and for all to store predetermined telephone numbers, cannot thereafter be modified to store other such numbers.

Other known devices for storing telephone numbers are based on the use of endless magnetic tapes, wound up on reels, which must, in order to satisfy the norms of the telephone system, have a substantial diameter, because they must be driven at a relatively high constant speed.

The invention also relates to a process making it possible to store telephone numbers at any desired speed and then transmit, at the desired time, a series of pulses corresponding to these telephone numbers at the cadence and spacing between successive pulses required by the norms of the telephone system. This process is characterized by the fact that, when recording, each of the digits constituting the telephone number to be recorded is first stored in a first register having four bistables in the form of a coded signal corresponding to a number which is the complement of the number appearing on a numbered key, and equal to the difference between the number 16 and this number, the 0 key being considered to correspond to the number 10 and thus serving to record a coded signal corresponding to the number 6, beofre pulses are transmitted to the recording head during the four successive steps taken by a step-by-step motor controlled by another register having two bistables, which causes the motor to advance in groups of four steps, during which steps whichever bistable is connected to the recording head is in state 1. All the bistables of the first register are then reset to 0, the release of the various numbered keys and an "end of recording" key, each transmitting a pulse, which pulses cause the motor to advance through a total of four successive steps and then stop. The motor may then be caused to advance semi-continuously until the magnetic drum has turned through a complete revolution. During reproduction the same two registers are used to advance the motor step by step in groups of four steps and store in the bistables of the first of these registers the signals read on the magnetic track during each advance of four steps by the motor, before actuating a pulse generator which delivers pulses conforming to telephone system norms, which is mounted in series with the telephone dial and which transmits to the line the number of pulses necessary to reset the first register to zero, which then corresponds to one of the digits of a number which is to be called. This reset to zero differs in that the reproducing head is travelling over a blank section of the track which may be positioned immediately after the end of each group of four steps, and may drive the drum through a complete revolution before it is automatically stopped by an indicium on a special indexing track. This process may also comprise the step of actuating a suitable switch to cause immediate reproduction of a group of coded signals which have just been recorded on a magnetic track selected for that purpose at the end of the recording.

The characteristics of the present invention will be better understood from a reading of the following description of one embodiment of the apparatus, which is used for storing telephone numbers, which embodiment is described purely by way of illustration and example, with reference to the accompanying drawings, in which.

Figure 1:
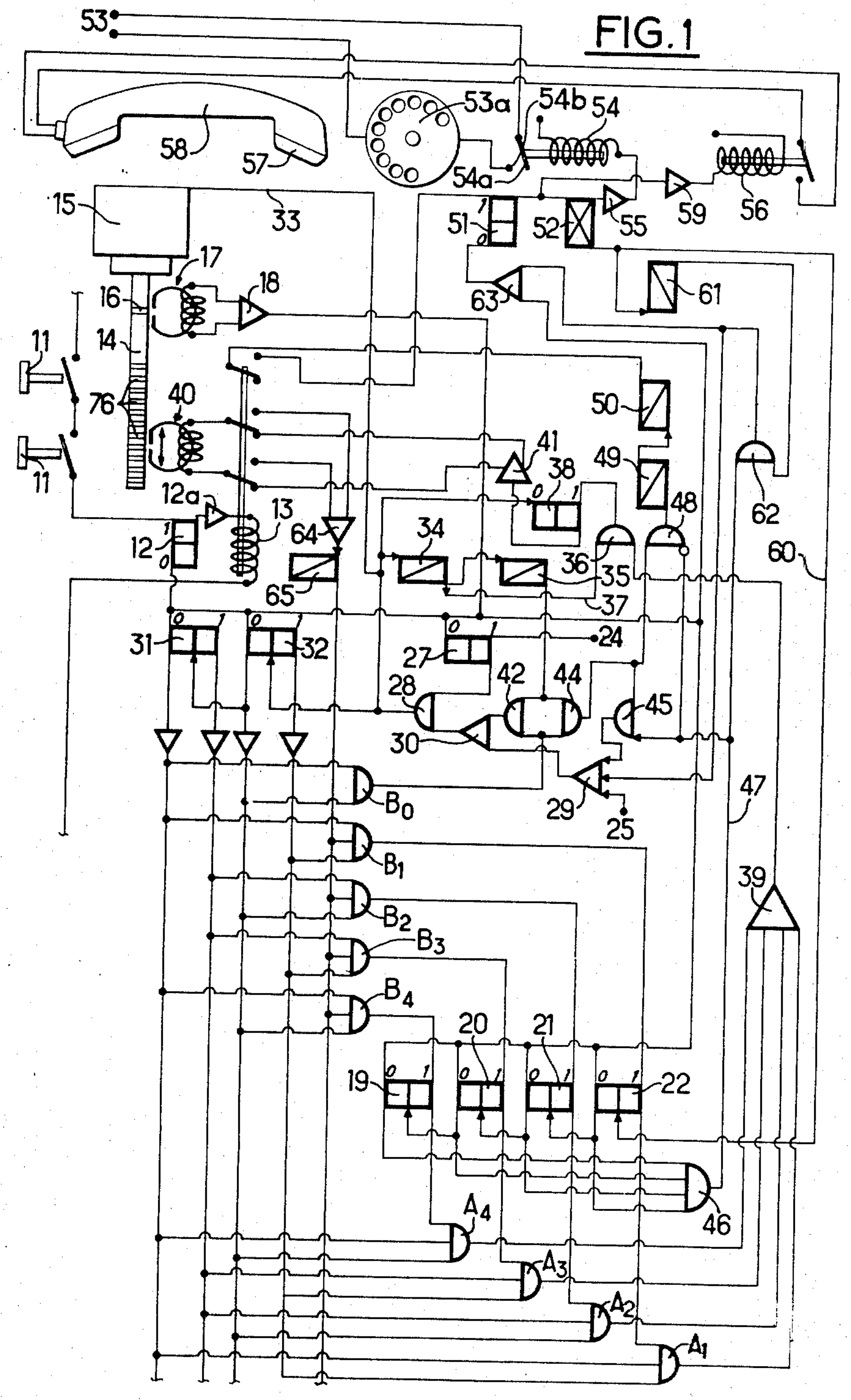
FIG. 1 is a circuit diagram showing the various electrical components of the device.
Figures 2, 3, 4:
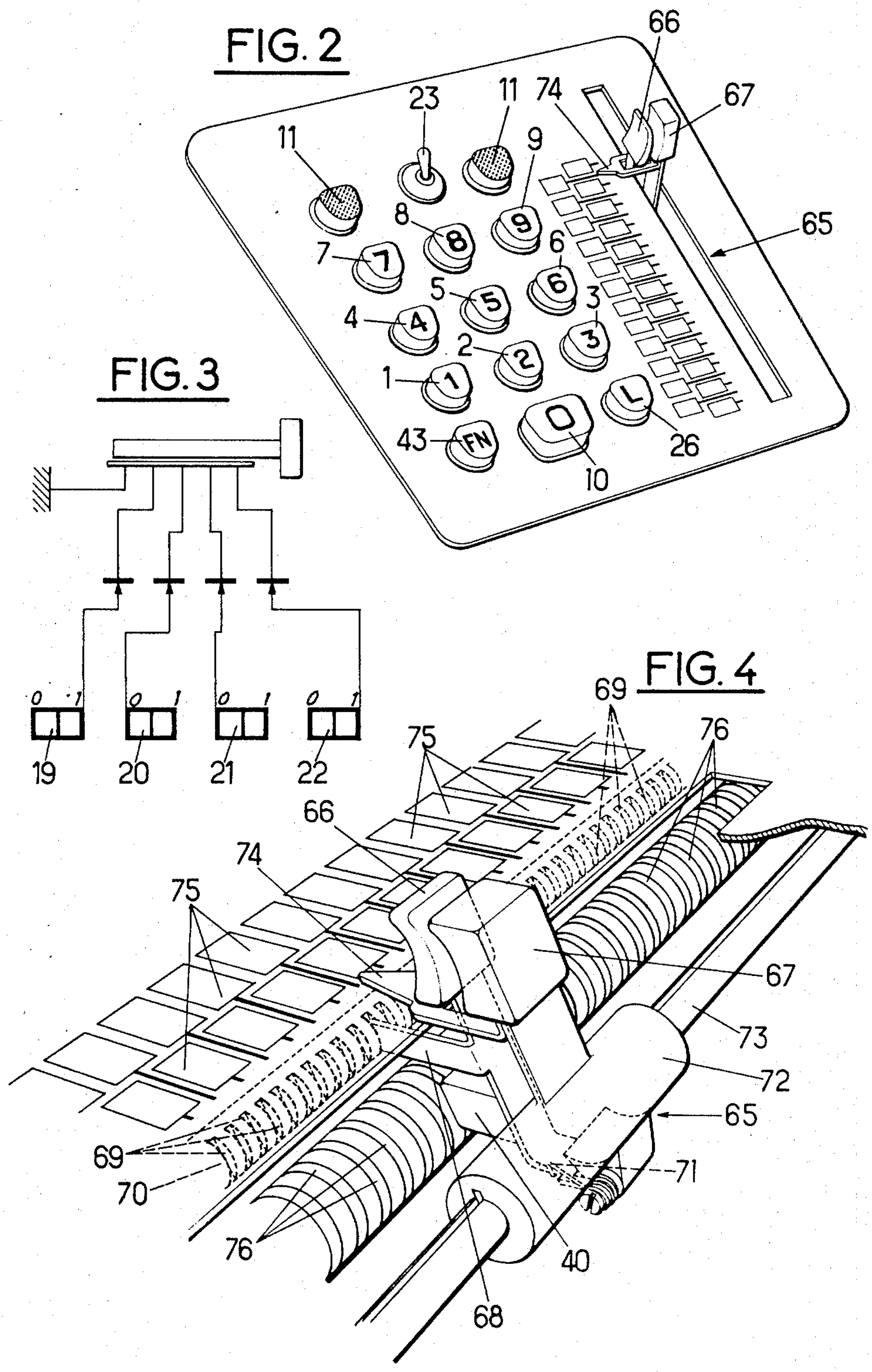
FIG. 2 is a perspective view of the keyboard and magnetic track selector of said device.
FIG. 3 is a partial circuit diagram showing by way of example the circuitry between a numbered key on the keyboard, which is assumed to have been depressed, and a register comprising four bistables for temporarily storing coded signals which are to be subsequently recorded on a magnetic track.
FIG. 4 is a perspective view of the track selector of FIG. 2.
Figure 5:
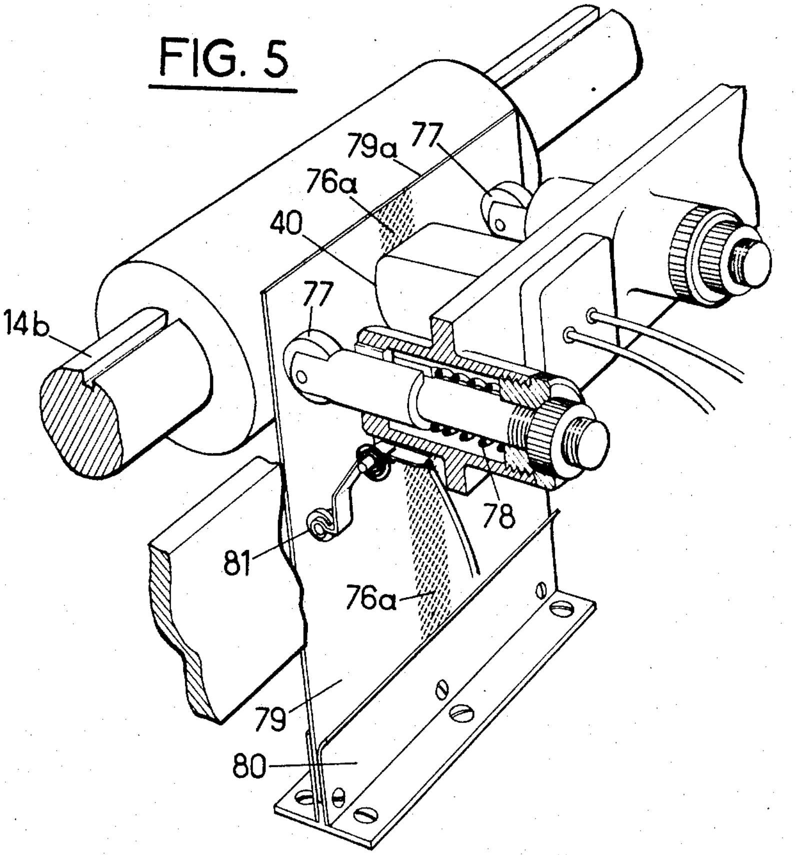
Figure 6:
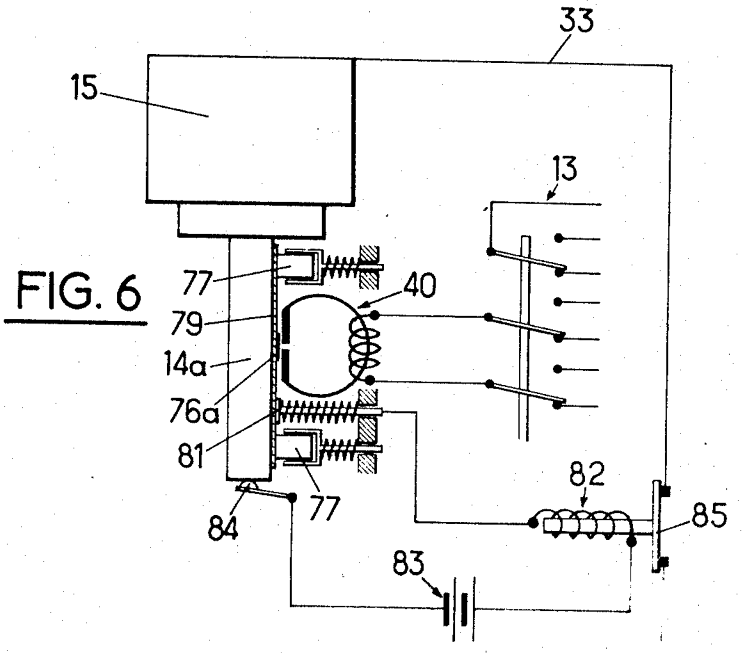

FIGS. 1 and 2 show that, by simultaneously depressing the two keys 11, the coil of a relay 13 may be excited through the bistable 12 and amplifier **12*a*. This three-pole relay controls the shift between recording and reproduction, and is thrown to recording position when the coil of relay 13 is excited, that is to say when the bistable 12** is in positon 1.

It will be hereinafter seen that this bistable is reset to zero, so that the relay is returned to reproducing position, each time the magnetic drum 14 driven by the step-by-step motor 15 makes a complete revolution.

This drum carries an indexing track 16 which stops the drum 14 at the end of one complete revolution.

The corresponding indicium on the track 16 is reproduced by the indexing head 17 in the form of a pulse which is then amplified in an amplifier 18 and returns all the bistables of the device to zero.

The diagram of FIG. 1 does not show the connections which may be made by depressing the ten keys numbered 1 to 10 constituting the keyboard of FIG. 2.

These connections are shown on FIG. 3, for the particular case of the key carrying the number 7. When this key is depressed, the four bistables 19, 20, 21 and 22 of a buffer store are connected to ground, with the bistables 19 and 22 in state 1 and the bistables 20 and 21 in state zero. The resulting 1001 configuration corresponds in the binary code to the number 9, representing the difference between the number 16 and the number 7 of the key in question.

The process of recording on a selected magnetic track will now be described.

So long as the bistable 12 is in position 1, and before it is reset to zero after a complete revolution of the drum 14, the relay 13 remains excited, and the digits of a telephoen number may be recorded by successively depressing the corresponding numbered keys.

When the switch 23 (FIG. 2) is in the "automatic reproduction" position, the de-excitation of the relay 13 after a complete revolution causes the transmission of a pulse to the input terminals 24 and 25, thus initiating the immediate reproduction of the signals recorded during the previous revolution, and their transmission over the telephone line.

In the other position of the switch 23, no pulse is transmitted to the input terminals 24 and 25, and in order to initiate the reproduction of these signals and their transmission over the telephone line, it is necessary to produce such a pulse by depressing the "reproduce" key 26 of the keyboard shown in FIG. 2.

Let it be supposed that all bistables of the device are in state 0 except the bistable 12, which has just been shifted to state 1 by depression of the keys 11.

By then depressing a numbered key, such as the key 7 of FIG. 3, for example, the buffer store comprising the four bistables 19 to 22 is caused to assume a configuration which corresponds, in binary code, to a number complementary to that of the key depressed, that is to say, to the number 9 in the particular case of the key 7.

The release of this key transmits a pulse to the input terminals 24 and 25. The bistable 27 then opens a gate 28 to the pulse from 25, which has passed through the two "or" gates 29 and 30.

This pulse shifts a second register consisting of the bistables 31 and 32 into the position 0–1, and is also transmitted through a conductor 33 to the motor 15, which advances one step, driving the drum 14.

The pulse passed by the gate 28 is transmitted to a monostable 34 which, after a recording delay of about two milliseconds, emits a pulse which is transmitted on the one hand to a second monostable 35, and, on the other hand, to a gate 36 through the conductor 37, but the pulse in question cannot pass through the gate 36 to shift the recording bistable 38 to state 1 unless the gate $A_1$ of a distributor A is open and provides a connection to the gate 36 through the "or" gate 39.

However, this gate $A_1$ is not open when the two bistables 31 and 32 are respectively in state 0 and in state 1, unless the bistable 22 of the first register is in state 1.

The recording bistable 38 thus does not transmit a signal to the magnetic head 40 through the amplifier 41 and the "recording" contacts of the relay 13 unless the bistable 22 is in state 1.

If this bistable is, on the contrary, in state 0, there is no recording during the first step of the motor 15.

The monostable 35, at the end of a certain time which is added to the two millisecond delay of monostable 34, transmits a counting pulse through gate 42, and the "or" gate 30 and the gate 28 to the register comprising the two bistables 31 and 32, which then changes into position 1–0. This counting pulse will also advance the motor 15 another step, since it is transmitted to the motor by the conductor 33.

During this second step, a new pulse, emitted by the monostable 34, cannot pass through the gate 36 and is not transmitted to the recording bistable 38, the amplifier 41 and the head 40, unless the gate $A_2$ is open, that is to say, unless the bistable 21 is in state 1, at the same time that the bistables 31 and 32 are respectively in states 1 and 0.

During the third step the bistables 31 and 32 are in states 1 and 1, and the gate $A_3$ will open only if the bistable 20 is in state 1.

Finally, when the two bistables 31 and 32 return to 0, the gate $A_4$ is open only if the bistable 19 is in state 1.

As has already been seen, the configuration of the buffer store comprising the four bistables 19, 20, 21 and 22 during each advance of four steps by the motor, resulting from the depression of a numbered key, corresponds to the difference between the number 16 and the number of the key in question. Consequently, depression of the key 10 carrying the number 0 imparts to this configuration that of a signal corresponding in binary code, to the number 6.

When the fourth step has been carried out, the pulse emitted by the monostable 35 can no longer reach the bistables 31 and 32 unless the buffer store comprising the bistables 19 and 22 has returned to 0, since at this moment, with the register in 0–0 state, opening of the gate $B_0$ closes the gate 42. The motor 15 thus stops after each group of four steps.

After having "set up" the entire telephone number, the key 43 marked FN is depressed, which resets the four bistables 19–22 to zero, and permits the pulse emitted by the motostable 35 to pass through the gates 44 and 45 as soon as the gate 46 is opened, after the four bistables 19 to 22 have returned to zero. This pulse opens the gate 45 after passing the conductor 47.

The signal reaching the gate 45 passes through the "or" gates 29 and 30 before reaching the gate 28 and actuating the bistables 31 and 32 and the motor 15.

As has already been indicated, the drum 14 then continues to turn in a quasi-continuous manner through a succeeding group of four steps until the magnetic head 17 reaches the aforesaid indicium and returns all the bistables of the device to zero.

The operation of the device for reproduction will now be described, beginning either immediately after the end of a complete rotation of the drum 14 on which a recording has just been made, if the switch 23 is in the desired position, or thereafter by depressing the reproducing key 26.

This reproducing key transmits a pulse to the terminals 24 and 25, and advances the motor 15 by one step.

If a 1 has been recorded on the portion of the magnetic track read during the course of this first step, the bistable 22 shifts to state 1. If not, it remains in state 0, and just as during recording, so long as the four bistables 19–22 are not all at 0, the step-by-step motor will advance only in groups of four steps.

The pulse emitted by the monostable 35 after the end of the fourth step passes through the gate 44 and a gate 48 and actuates two monostables 49 and 50, while insuring a delay between the successive numbers before they are transmitted to the telephone line in the form of pulses.

This gate 48 closes when all the bistables 19–22 are returned to state 0.

The monostables 49 and 50 are connected, when in reproducing position, to a bistable 51 which is then shifted to state 1, thus energizing an astable multi-vibrator 52 so that pulses may be transmitted to the telephone line 53 through a relay 54 and an amplifier 55. A second relay 56, which short-circuits the receiver 57 of a combined mouthpiece and receiver 58, is actuated by the bistable 51 through an amplifier 59.

The relay 54 interrupts the current in the line 53 through the armature **54*a* and the contact 54*b*, which are connected in series with the dial 53*a* of the telephone connected to the line 53**.

The pulses according to telephone system standards which are emitted by the astable multivibrator 52, are also transmitted by the conductor 60 to the buffer store comprising the four bistables 19–22. These pulses add to the contents of that buffer store until the four bistables 19–22 are returned to state 0.

After a certain delay, due to a monostable 61 which opens a gate 62, the bistable 51 is reset to zero by the "or" gate 63, which cuts out the astable 52.

The pulse emitted by the monostable 61, which passes through the gate 62, is retransmitted through the gates 29, 30 and 28, to the register comprising the two bistables 31 and 32, so that a new advance of four steps may be made.

When this register is in position 0–1, the gate $B_1$ may be opened if a 1 is recorded on the portion of the magnetic track being "read" during the step in question. This signal is "read" by a reading amplifier 64 and a monostable 65 for reshaping the pulse, so as to shift the bistable 22 to state 1, if necessary.

In like manner, if there is a recording corresponding to the number 1 during each of the other three steps, the gates $B_2$, $B_3$ and $B_4$ permit the bistables 21, 20 and 19 which are respectively connected to said gates, to be shifted to state 1.

If, during these four steps any signal 1 is not transmitted by the amplifier 64, the four bistables 19–22 all remain at zero, which assures a new advance of four steps by the motor 15, until a pulse from the amplifier 18 resets this group of bistables to zero.

FIGS. 2 and 4 show a track selector 66 which comprises releasing means **66*a* which, when it approaches a member 67, permits the finger 68 to be disengaged from the notches 69 in a rod 70**, shown in broken lines.

When the member 68, which is biased by the spring 71, is withdrawn from the notches 69, the lower part of the selector may be slid along a rod 73 to bring the finger 68 opposite another notch 69. This moves an index finger 74 along the indicia 75 which are preferably staggered, and moves the head 40 along the set of magnetic tracks 76 shown in FIGS. 1 and 4, to those which have been selected.

It will be appreciated that the device which has just been described may be modified as to details, and its individual components replaced by their mechanical equivalents, without thereby departing from the basic principles of the invention.

In particular, as has already been pointed out, the device for selecting the magnetic tracks may be eliminated by replacing the magnetic drum with a plain drum carrying removable magnetic tapes.

In this case, a removable magnetic tape is introduced between the plain drum and the magnetic head, for both recording and reproducing. This tape may be ordinary tape recorder tape glued to a strip of cardboard, which may be placed with its upper part in alignment with the magnetic head and which may then be recorded or "read" step-by-step by said magnetic head, with the cardboard rising progressively due to the rotation of the drum until it is automatically ejected, or manually withdrawn.

The motor is then automatically stopped and the bistables reset to zero by a simple electric switch, which is open when in recording or reproducing position, and replaces the indexing tracks and the indexing magnetic head.

It is also possible to provide an unlimited number of cards corresponding to an unlimited number of telephone numbers and store them in a suitable file which may be alphabetical.

The device may also in this case permit reading and transmission immediately after recording, for example by automatic dropping of cards which have just been recorded.

What is claimed is:

1. A repertory telephone dialer including a magnetic memory wherein said magnetic memory comprises in combination:

(A) a drum carrying a plurality of juxtaposed annular magnetic tracks, (B) a buffer element comprising four bistable elements for registering successive decimal digits of a telephone number in binary code, (C) a magnetic head coupled to said buffer element and mounted to selectively be positioned adjacent to any one of said tracks for selectively either writing in series on the selected track the bits corresponding to the decimal digits or to read recorded digits in series, (D) a stepping motor connected to step drive said drum a short preselected step interval once for each bit written on the selected track, (E) a pulse generator for triggering each step of the motor, (F) means for transmitting a telephone number read from said memory over a telephone line, (G) keyboard means for entering a telephone number comprising successive decimal digits into said memory, (H) logic circuit means for converting the successive decimal digits of said telephone number produced by said keyboard means into said binary code for entry into said buffer element, the binary code corresponding to a complement of each decimal digit, (I) a logic circuit controlled by said keyboard and connected to said pulse generator and through which said motor is driven in groups of four steps, said circuit operating said buffer element for successively storing signals representing said successive digits of said telephone number in binary code when corresponding keys on said keyboard are actuated, said circuit being adapted to release, both when said buffer store is operated to store one of said successive digits and when said buffer store remains at zero after resetting, a pulse which initiates four more steps by said motor, and (J) means for resetting said buffer store to zero.

2. A memory according to claim 1 in which the stepping motor is connected to have at least a small interval in each step when, because of acceleration and deceleration, the motor is not driven at its maximum velocity.

3. A memory according to claim 1, wherein the complement is the sixteens complement of each decimal digit.

4. A memory according to claim 3 further comprising: switch means for alternatively connecting said magnetic head to said buffer store through alternate paths respectively for recording or for reproducing and for connecting the buffer store after each group of four steps to the pulse generator in series with said telephone line for reproducing.

5. A memory as claimed in claim 1 in which said drum is coated with a magnetic material.

6. A memory as claimed in claim 4 comprising an additional switch which is operable to initiate reproduction immediately after the completion of a recording or immediately after the end of a complete revolution of the drum.

7. A memory as claimed in claim 1 in which said means for resetting said buffer to zero comprises a key on said keyboard which, when operated, returns the four bistable elements of said buffer element to zero.

8. A memory as claimed in claim 1 in which said keyboard comprises a reproducing key connected to initiate the reproduction of a previously selected magnetic track by causing the transmission of a pulse which initiates the advance of said stepping motor for the first group of four successive steps.

9. Device as claimed in claim 1 in which pulses transmitted by the pulse generator triggering said motor are added in binary form in said buffer element to those pulses recorded during the reproduction of said selected magnetic track during the preceding advance of the motor and drum through four successive steps until the said buffer element is returned to zero.

10. Method of storing telephone numbers in a magnetic memory at any desired speed and subsequently transmitting said numbers over a telephone line in the form of groups of pulses produced at a predetermined speed and corresponding to the individual digits of said telephone numbers, said method comprising the steps of:

(A) simultaneously storing in four bistable elements of a buffer store, a configfiuration corresponding to one of the successive decimal digits making up a telephone number, (B) recording the bits representative of said coded configuration in series on a single preselected drum-carried magnetic track by means of a single magnetic head, and (C) reproducing in series by means of said head the bits previously recorded on said magnetic track and restoring the corresponding previously recorded configurations in the same bistables of said buffer store, each configuration corresponding in binary code to the number 16 decreased by the digit to be transmitted, and the configuration corresponding to zero being utilized only after all of the configurations of said successive decimal digits have been stored, wherein a telephone number which has been stored is reproduced by (D) pressing a "reproduce" key on a keyboard which transmits a first pulse which advances a stepping motor through four steps to advance said track and cause said signal to be recorded in said buffer store during said four steps, and (E) automatically starting said pulse generator after the end of each group of four successive sets so as to reset said buffer store to zero by adding the pulses emitted by said generator to those corresponding to the coded signal which has been stored in the buffer store.

11. Method as claimed in claim 10, further comprising the step of actuating a switch in said keyboard to cause immediate reproduction of a telephone number which has just been stored, after the motor has advanced for the number of steps necessary to reposition relative to said head the recorded part of the track which corresponds to said telephone number.

12. Method as claimed in claim 10, further comprising the step of using a special indexing track which cooperates with a special magnetic head, to stop the drum and motor after a complete revolution, and initiating a semi-continuous driving of the motor when said register is reset to zero.

13. Means for storing telephone numbers in a magnetic memory at any desired speed and subsequently transmitting said numbers over a telephone line in the form of groups of pulses produced at a predetermined speed and corresponding to the individual digits of said telephone numbers, comprising:

(A) means for simultaneously storing in four bistable elements of a buffer store, a configuration corresponding to one of the successive decimal digits making up a telephone number, (B) means for recording the bits representative of said coded configuration in series on a single preselected drum-carried magnetic track by means of a single magnetic head, and (C) means for reproducing in series by means of said head the bits previously recorded on said magnetic track and restoring the corresponding previously recorded configurations in the same bistables of said buffer store, each configuration corresponding in binary code to the number 16 decreased by the digit to be transmitted, and the configuration corresponding to zero being utilized only after all of the configurations of said successive decimal digits have been stored, wherein means are provided for reproducing a telephone number which has been stored further comprising:

(D) a "reproduce" key on a keyboard which, when pressed, transmits a first pulse which advances a stepping motor through four steps to advance said track and cause said signal to be recorded in said buffer store during said four steps, and (E) means for automatically starting the pulse generator after the end of each group of four successive sets so as to reset said buffer store to zero by adding the pulses emitted by said generator to those corresponding to the coded signal which has been stored in the buffer store.

References Cited

UNITED STATES PATENTS

| | | | |
|---|---|---|---|
| 3,474,429 | 10/1969 | McCowen | 340—174.1 A |
| 3,275,208 | 9/1966 | Poumakis | 340—174.1 A |
| 3,454,930 | 7/1969 | Schoeneman | 340—174.1 A |
| 3,465,128 | 9/1969 | Poumakis | 340—174.1 A |
| 3,387,098 | 6/1968 | Fischer | 179—90 BB |
| 2,936,444 | 5/1960 | Hieken | 340—174.16 |
| 3,430,004 | 2/1969 | Shenk | 179—90 |
| 3,364,314 | 1/1968 | Huizinga et al. | 179—90 |
| 3,254,162 | 5/1966 | Miller et al. | 179—90 |
| 3,243,517 | 3/1966 | Miller et al. | 179—90 |
| 3,234,336 | 2/1966 | Wells | 179—90 |
| 3,105,121 | 9/1963 | Field | 179—90 |
| 2,941,043 | 6/1960 | Ham | 179—90 |
| 2,930,854 | 3/1960 | Paul | 179—90 |

KATHLEEN H. CLAFFY, Primary Examiner
T. D'AMICO, Assistant Examiner

U.S. Cl. X.R.

179—90 BD